(12) United States Patent
Regenscheit

(10) Patent No.: US 9,669,709 B2
(45) Date of Patent: Jun. 6, 2017

(54) DRIVE TRAIN FOR A VEHICLE

(71) Applicant: ZF Friedrichshafen AG, Friedrichshafen (DE)

(72) Inventor: Norman Regenscheit, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/860,955

(22) Filed: Sep. 22, 2015

(65) Prior Publication Data

US 2016/0082835 A1 Mar. 24, 2016

(30) Foreign Application Priority Data

Sep. 23, 2014 (DE) .................. 10 2014 219 104

(51) Int. Cl.
| | |
|---|---|
| *B60K 17/16* | (2006.01) |
| *B60K 5/02* | (2006.01) |
| *B60K 17/06* | (2006.01) |
| *B60K 17/22* | (2006.01) |
| *F16H 1/20* | (2006.01) |
| *F16H 57/02* | (2012.01) |
| *E02F 3/28* | (2006.01) |
| *B60K 5/00* | (2006.01) |

(52) U.S. Cl.
CPC ............... *B60K 17/16* (2013.01); *B60K 5/02* (2013.01); *B60K 17/06* (2013.01); *B60K 17/22* (2013.01); *F16H 1/20* (2013.01); *F16H 57/02* (2013.01); *B60K 2005/003* (2013.01); *E02F 3/283* (2013.01); *F16H 2057/02056* (2013.01)

(58) Field of Classification Search
CPC ........ B60K 17/00; B60K 17/06; B60K 17/16; B60K 17/22; B60K 17/344; B60K 17/346; B60K 5/02; E02F 3/83; F16H 1/20; F16H 57/02; F16H 2057/02056
See application file for complete search history.

(56) References Cited

U.S. PATENT DOCUMENTS

| | | | |
|---|---|---|---|
| 2,314,833 A * | 3/1943 | Keese .................. | B60K 17/344 180/247 |
| 2,630,872 A * | 3/1953 | Roos ...................... | B60K 17/28 180/53.1 |

(Continued)

FOREIGN PATENT DOCUMENTS

| | | |
|---|---|---|
| EP | 0 949 106 A1 | 10/1999 |
| EP | 1 312 498 A2 | 5/2003 |

*Primary Examiner* — Brian Swenson
(74) *Attorney, Agent, or Firm* — Davis & Bujold, PLLC; Michael J. Bujold

(57) ABSTRACT

A drive-train which comprises a drive engine that can be fitted in the longitudinal direction of the vehicle, between the driving wheels, with a drive output shaft connected to a drive input shaft of a transfer case. The drive output shaft of the transfer case is connected to a drive input shaft of a gearshift transmission, whose drive output can be brought into connection with vehicle wheels. The transfer case is preferably in the form of a spur gear assembly. The drive engine and the gearshift transmission are arranged in the longitudinal direction of the vehicle and are connected to the transfer case on the same side of the transfer case. The outer spur gears, of the spur gear assembly, have a larger diameter than the inner spur gears.

7 Claims, 2 Drawing Sheets

(56) References Cited

U.S. PATENT DOCUMENTS

| | | | | |
|---|---|---|---|---|
| 4,470,476 | A * | 9/1984 | Hunt | B60K 6/26 |
| | | | | 180/65.25 |
| 5,478,192 | A * | 12/1995 | Bentivoglio | B66F 9/16 |
| | | | | 180/251 |
| 5,618,156 | A * | 4/1997 | Brown | B60K 17/34 |
| | | | | 180/237 |
| 5,687,809 | A * | 11/1997 | Braud | B60K 5/04 |
| | | | | 180/292 |
| 6,105,710 | A * | 8/2000 | Vandepitte | B60K 17/04 |
| | | | | 180/337 |
| 6,152,253 | A * | 11/2000 | Monaghan | B60K 5/02 |
| | | | | 180/291 |
| 6,904,994 | B2 * | 6/2005 | Coutant | B60K 11/02 |
| | | | | 180/291 |
| 7,998,009 | B2 * | 8/2011 | Zhao | B60K 17/105 |
| | | | | 180/377 |
| 2003/0010561 | A1 * | 1/2003 | Bartel | B60K 17/043 |
| | | | | 180/292 |
| 2003/0215321 | A1 * | 11/2003 | Kinoshita | B66F 9/0655 |
| | | | | 414/728 |

* cited by examiner

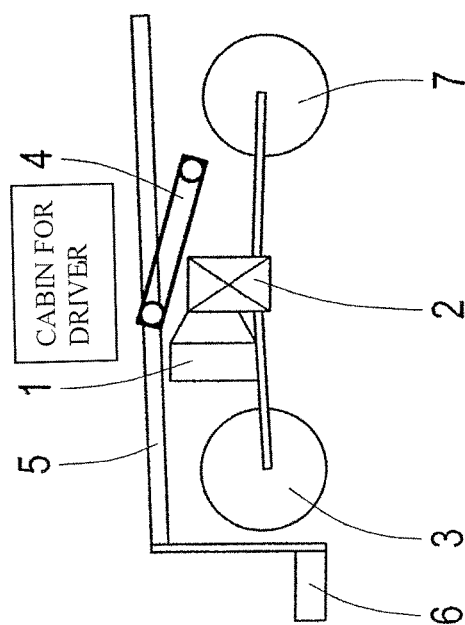
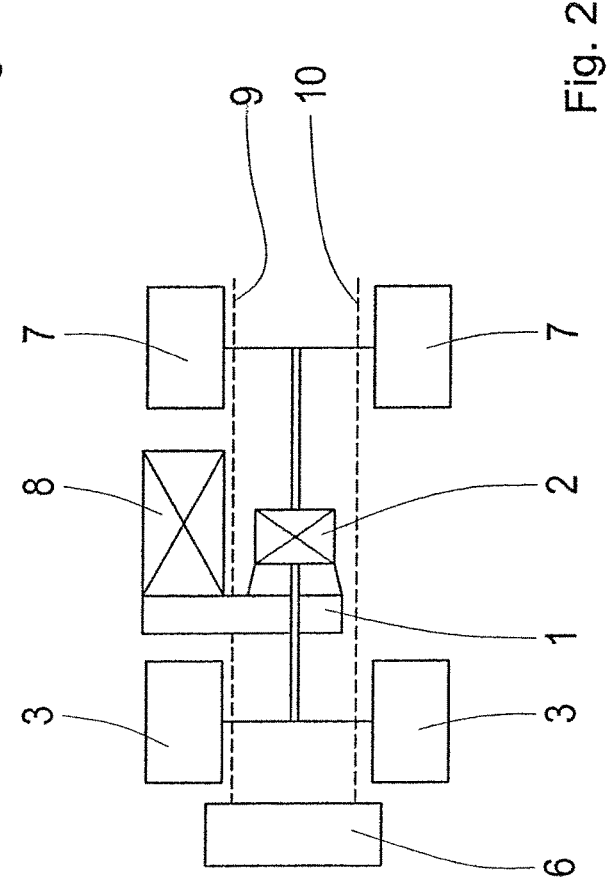

DRIVE TRAIN FOR A VEHICLE

This application claims priority from German patent application serial no. 10 2014 219 104.1 filed Sep. 23, 2014.

FIELD OF THE INVENTION

The invention relates to a drive-train for a motor vehicle.

BACKGROUND OF THE INVENTION

Drive-trains of this type are used in working machines having a laterally arranged drive engine, for example an internal combustion engine, a lifting arm arranged in the middle of the vehicle, for example having a scoop or a fork, and on the other side a driver's cabin arranged off-center. Such vehicles are also known as extendable-boom loaders.

EP1312498B1 discloses an extendable-boom loader with a drive engine arranged in the longitudinal direction of the vehicle and a gearshift transmission, whose drive output is in the area of the middle of the vehicle. The transmission is connected directly to the drive engine by a flange and therefore increases the length of the fitting space required between the wheels of the vehicle. For vehicles with a short wheel spacing this arrangement is unsuitable.

EP949106A1 discloses an extendable-boom loader with a drive engine arranged along the direction of travel, offset laterally relative to the middle of the vehicle, to which a transmission is flange-connected, wherein the drive output of the transmission is connected to a transfer case in the form of a spur gear assembly, wherein the drive output of the transfer case is arranged centrally in the vehicle and drives the vehicle's wheels. Since the gearshift transmission is connected directly to the drive engine, a lot of fitting space is needed between the wheels of the vehicle so that this drive unit arrangement is not suitable for vehicles with a short wheel spacing.

U.S. Pat. No. 6,152,253 discloses an extendable-boom loader with a drive engine arranged longitudinally along the travel direction, which is positioned laterally between the wheels and is connected to a transfer case, the output of which drives a gearshift transmission that powers the vehicle's wheels. The transfer case is in the form of a chain transmission, so that the transfer case can be made narrow. Since the transfer case has to extend from the space between the vehicle's wheels as far as the middle, the vehicle frame, in particular, the longitudinally extending plates thereof, have cut-outs over a substantial area, which necessitate complex and heavy reinforcement of the frame, that is arranged underneath the drive engine, the transfer case and the gearshift transmission.

SUMMARY OF THE INVENTION

The purpose of the present invention is to provide a drive-train for a working machine, such as an extendable-boom loader, in which the drive engine can be fitted along the travel direction and the vehicle frame can be left almost unmodified.

This objective is achieved by a drive-train of the type concerned which also embodies the characteristics specified in this invention.

The drive-train comprises a drive engine that can be fitted in the longitudinal direction of the vehicle between the driving wheels, with a drive output shaft connected to a drive input shaft of a transfer case. The drive output shaft of the transfer case is connected to a drive input shaft of a gearshift transmission, whose drive output can be brought into connection with vehicle wheels. The transfer case is preferably in the form of a spur gear assembly. The drive engine and the gearshift transmission are arranged in the longitudinal direction of the vehicle and are connected to the transfer case on the same side of the transfer case.

Preferably, the transfer case comprises at least three spur gears, the outer spur gears having a larger diameter than the inner spur gears. The contour of the housing of the transfer case follows the diameters of the spur gears, so that in the area of the middle of the transfer case the height of the housing is smaller than it is in the area of the outer spur gears. This enables the transfer case to be arranged under the frame of the vehicle, i.e. between the ground, on which the vehicle is standing, and the longitudinally extending frame components, and in the area where the transfer case extends through the frame component it is sufficient to make a small recess in the frame component, i.e. to locally reduce the height of the frame plate of the frame component.

Preferably, the drive output shaft of the drive engine and the drive input shaft of the gearshift transmission extend in the direction toward the front of the vehicle, whereby the components of the gearshift transmission having larger diameters can be arranged farther toward the front axle in order to be able to provide fitting space for the cylinder of the lifting arm.

BRIEF DESCRIPTION OF THE DRAWINGS

Further features emerge from the description of the figures.

These show:

FIG. 1: A side view of the vehicle;

FIG. 2: A plan view of the vehicle;

DETAILED DESCRIPTION OF THE PREFERRED EMBODIMENTS

FIG. 1

Figure 3:
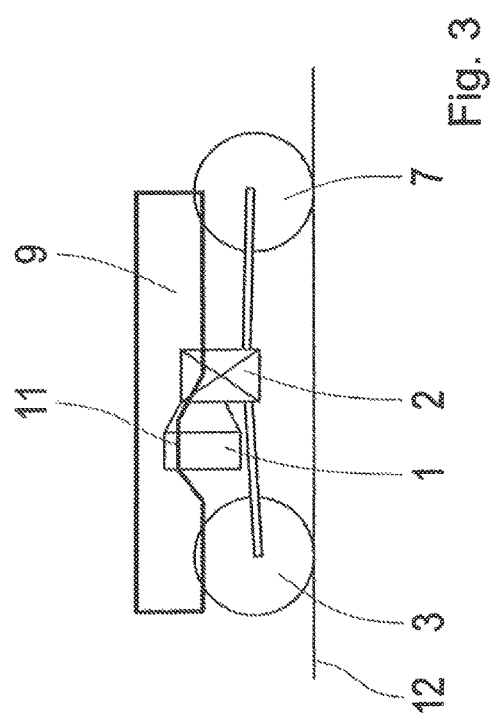
FIG. 3: A side view of the vehicle with part of the frame.
Figure 4:
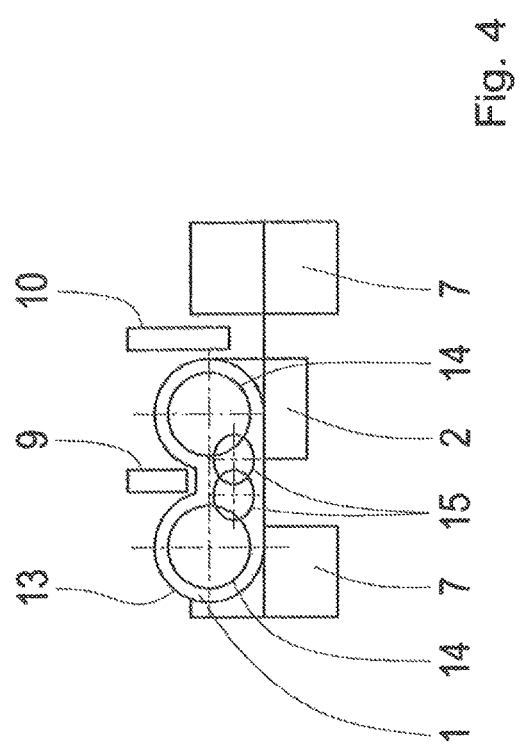
FIG. 4: A cross-section through the vehicle.

The transfer case 1 is connected to the gearshift transmission 2, and the gearshift transmission 2 has an expanded housing to accommodate a torque converter. The transfer case 1 is arranged as far as possible in the direction toward the front wheels 3. Above the gearshift transmission 2 there is a cylinder 4 for a lifting arm 5 with a scoop 6, the scoop 6 being positioned ahead of the front wheels 3. From the gearshift transmission 2, cardan shafts extend to the front wheels 3 and the rear wheels 7.

FIG. 2

The drive engine 8 is positioned a distance away from the gearshift transmission 2 and is connected to the gearshift transmission 2 by a transfer case 1. Both the of gearshift transmission 2 and the drive engine 8 are arranged in the longitudinal direction of the vehicle. The transfer case 1 is arranged transversely to the longitudinal direction of the vehicle. The drive engine 8 is arranged between the front wheels 3 and the rear wheels 7, outside a longitudinally extending frame component 9, and the gearshift transmission 2 is on the inside of the frame component 9 and another frame component 10. The transfer case 1 extends through the frame component 9 or is positioned under the frame component 9, in order to connect the drive engine to the gearshift transmission 2.

FIG. 3

The frame component 9 has a cut-away portion 11 under which the transfer case 1 is arranged. Thus, the transfer case 1 is between the surface 12 on which the vehicle's wheels 3 and 7 are standing and the frame component 9.

FIG. 4

The transfer case 1 has a housing 13 so designed that underneath the frame component 9, the height of the housing 13 is smaller than it is at the sides of the frame component 9. This is possible because the outer spur gears 14 have a larger diameter than the inner spur gears 15. Preferably, four spur gears are provided, which mesh with one another in such manner that the axial distance from the drive engine to the gearshift transmission 2 can be bridged. The contour of the housing 13 follows the outer diameter of the outer spur gears 14 and the inner spur gears 15, so that the transfer case 1 can be positioned under the frame component 9.

The outer spur gears 14 and the inner spur gears 15 are arranged so that in each case the outer spur gears 14 mesh with a respective one of the inner spur gears 15 while the inner spur gears 15 mesh with one another, in such manner that the transfer case 1 comprises only a single spur gear series so that the transfer case 1 can be made very narrow.

INDEXES

| | |
|---|---|
| 1 | Transfer case |
| 2 | Gearshift transmission |
| 3 | Front wheels |
| 4 | Cylinder |
| 5 | Lifting arm |
| 6 | Scoop |
| 7 | Rear wheels |
| 8 | Drive engine |
| 9 | Frame component |
| 10 | Frame component |
| 11 | Cut-away portion |
| 12 | Surface |
| 13 | Housing |
| 14 | Outer spur gears |
| 15 | Inner spur gears |

The invention claimed is:

1. A drive-train for a motor vehicle, in which a lifting arm (5) being arranged between a drive engine (8) and a cabin for a driver,
    the drive-train comprising the drive engine (8) and a shiftable transmission (2),
    a drive input shaft of the shiftable transmission (2) being laterally spaced from a drive output shaft of the drive engine (8),
    the drive input shaft of the shiftable transmission (2) being connected to the drive output shaft of the drive engine (8) by a transfer case (1),
    a frame component having a cut-away portion (11), and
    the transfer case (1) comprising a spur gear assembly having at least three spur gears (14, 15) of which both opposed outer spur gears (14) of the spur gear assembly having a larger diameter than each inner spur gear (15) of the spur gear assembly, a middle section of the transfer case having a smaller vertical height than a vertical height of each outer section of the transfer case, and the cut-away portion (11) of the frame component being located between the outer sections of the transfer case and vertically above the middle section of the transfer case.

2. The drive-train according to claim 1, wherein the transfer case (1) has a housing (13) with an outer contour that follows a shape imposed by the diameters of the at least three spur gears.

3. The drive-train according to claim 1, wherein the spur gear assembly has only one spur gear arranged on each of the drive input and the drive output shafts.

4. The drive-train according to claim 1, wherein the drive input shaft of the transfer case (1), which is connected to the drive output shaft of the drive engine (8), and the drive output shaft of the transfer case (1), which is connected to the drive input shaft of the gearshift transmission (2), are arranged on opposite sides of the transfer case (1).

5. The vehicle according to claim 1, wherein a front end of the lifting arm (5) is connectable to a scoop (6),
    the scoop is arranged at a front side of the vehicle, and the drive output shaft of the drive engine (8), and
    the drive input shaft of the gearshift transmission (2) are arranged in a direction of the front side of the vehicle.

6. A transfer case in combination with a drive train of a motor vehicle, in which a lifting arm (5) is arranged between a drive engine (8) and a cabin for a driver,
    the drive-train comprising the drive engine (8) and a shiftable transmission (2),
    a drive input shaft of the shiftable transmission (2) being laterally spaced from a drive output shaft of the drive engine (8),
    the drive input shaft of the shiftable transmission (2) being connected to the drive output shaft of the drive engine (8) by the transfer case (1),
    the transfer case (1) comprising a spur gear assembly having at least three spur gears (14, 15) of which both opposed outer spur gears (14) have a larger diameter than each inner spur gear (15) of the spur gear assembly, and
    the transfer case having a housing (13) that follows an outer contour of the at least three spur gears such that the transfer case has a larger vertical height adjacent the engine and a larger vertical height adjacent the transmission and a smaller vertical height, between the engine and the transmission, and the smaller vertical height forms a height reduction, between the engine and the transmission, which facilitates accommodating a frame component of the vehicle.

7. A vehicle having a lifting arm (5) that is arranged between a drive engine (8) and a cabin for a driver, in combination with a drive train comprising the drive engine (8) and a shiftable transmission (2),
    a drive input shaft of the shiftable transmission (2) being laterally spaced from a drive output shaft of the drive engine (8),
    the drive input shaft of the shiftable transmission (2) being connected to the drive output shaft of the drive engine (8) by a transfer case (1),
    the transfer case (1) comprising a spur gear assembly having at least three spur gears (14, 15) of which both opposed outer spur gears (14) have a larger diameter than each inner spur gear (15) of the spur gear assembly, and a middle section of the transfer case having a smaller vertical height than a vertical height of each outer section of the transfer case,
    the vehicle having a vehicle frame with first and second frame components (9, 10) extending in a longitudinal direction of the vehicle, and the first frame component (9) having a local cut-away portion (11), and
    the transfer case being arranged between the local cut-away portion (11) of the first frame component (9) and a surface (12) on which wheels (3, 7) of the vehicle engage with and the cut-away portion of the frame component being located between the outer sections of the transfer case.

\* \* \* \* \*